(12) United States Patent
Bacardit et al.

(10) Patent No.: US 9,663,087 B2
(45) Date of Patent: May 30, 2017

(54) VACUUM BRAKE BOOSTER HAVING TUBES THROUGH WHICH ATTACHMENT SCREWS PASS AND METHOD FOR REALIZING SAME

(71) Applicant: Robert Bosch GmbH, Stuttgart (DE)

(72) Inventors: Joan Simon Bacardit, Barcelona (ES); Bruno Berthomieu, Gava (ES)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 14/404,682

(22) PCT Filed: May 22, 2013

(86) PCT No.: PCT/EP2013/060484
§ 371 (c)(1),
(2) Date: Dec. 1, 2014

(87) PCT Pub. No.: WO2013/178513
PCT Pub. Date: Dec. 5, 2013

(65) Prior Publication Data
US 2015/0143992 A1    May 28, 2015

(30) Foreign Application Priority Data

May 31, 2012  (FR) .................................... 12 55037

(51) Int. Cl.
*F16J 10/00* (2006.01)
*B60T 13/567* (2006.01)

(52) U.S. Cl.
CPC ........ *B60T 13/567* (2013.01); *B60T 13/5675* (2013.01); *Y10T 29/49236* (2015.01)

(58) Field of Classification Search
CPC ........................... B60T 13/567; B60T 13/5675
See application file for complete search history.

(56) References Cited

U.S. PATENT DOCUMENTS

| | | | | |
|---|---|---|---|---|
| 5,410,880 A * | 5/1995 | Schluter | .............. | B60T 13/5675 92/169.3 |
| 5,447,030 A * | 9/1995 | Wang | .................. | B60T 13/5675 92/169.3 |
| 6,561,077 B2 * | 5/2003 | Castel | ................... | B60T 13/567 92/169.3 |

(Continued)

FOREIGN PATENT DOCUMENTS

| | | |
|---|---|---|
| CN | 2853531 Y | 1/2007 |
| CN | 102123896 A | 7/2011 |
| EP | 2 058 195 | 5/2009 |

*Primary Examiner* — Michael Leslie
(74) *Attorney, Agent, or Firm* — Gerard Messina

(57) ABSTRACT

A vacuum-operated brake booster includes a housing which consists of a bottom and a cover having an intermediate piston through which tubes, through which attachment screws are to pass, extend. The front end of the tube is threaded, and a peripheral groove is provided behind the thread, a flange being crimped in the groove behind the cover in the housing. The master cylinder is attached via the lugs thereof, which are fitted into the front end of the tube against the front surface of the cover and locked by the nut screwed onto the thread. The front end of the tube has a peripheral groove receiving the flange that consists of a ring and a sleeve, the lip of which penetrates into the groove by crimping. A gasket completes the seal.

5 Claims, 5 Drawing Sheets

(56) References Cited

U.S. PATENT DOCUMENTS

| | | | |
|---|---|---|---|
| 6,623,048 B2* | 9/2003 | Castel | B60T 13/5675 91/376 R |
| 6,918,249 B2* | 7/2005 | Maligne | B60T 13/5675 91/376 R |
| 7,331,275 B2* | 2/2008 | Sexton | B60T 13/5675 92/169.3 |
| 2007/0089601 A1 | 4/2007 | Sexton et al. | |

* cited by examiner

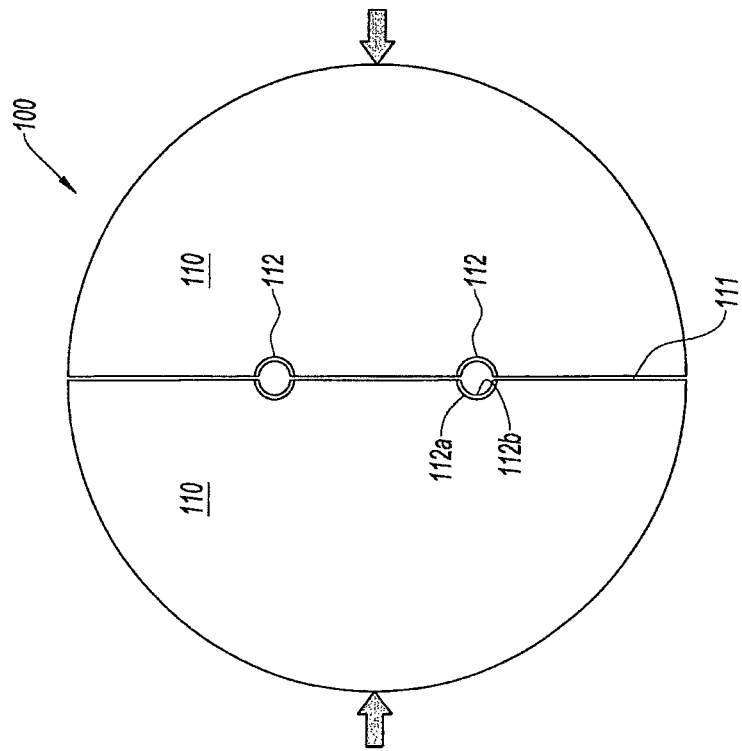
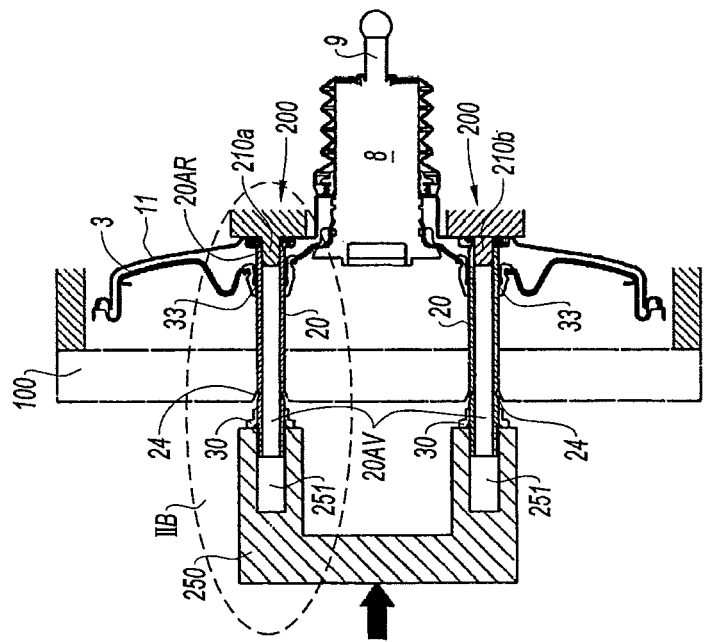
Fig. 2
Fig. 2A

VACUUM BRAKE BOOSTER HAVING TUBES THROUGH WHICH ATTACHMENT SCREWS PASS AND METHOD FOR REALIZING SAME

FIELD OF THE INVENTION

The present invention concerns a vacuum brake booster whose housing, consisting of a back and a cover with an intermediary piston, delimiting two chambers therein, is traversed by tubes for the passage of screws for securing the booster to the vehicle's passenger compartment, each tube being secured by crimping its rear extremity in an opening in the back of the housing and near the front extremity, at a through-hole in the cover, the tube has a peripheral support inside the housing and traverses the cover to accommodate, on the exterior, a lug of the master cylinder, secured by a screwed nut. The present invention also relates to a method for the realization of such a vacuum brake booster.

BACKGROUND INFORMATION

A brake booster having attachment tubes is discussed, for example, in EP 2,058,195.

FIG. 4, which is based on FIG. 2C of EP 2,058,195, shows the bypass tube of a vacuum brake booster according to the state of the art. The references found in FIG. 2C of EP 2,058,195 are used here as a reminder of the state of the art.

Screw bypass tube 222 is attached to back 213 by its fold 240, which forms a support surface. Cover 215 is attached, near the other end of the bypass tube, by washer 230, which presses against an axial stop in the form of a fold realized at this location of bypass tube 222. Beyond cover 215, the bypass tube has a threaded exterior zone accommodating a sleeve enlarging the diameter and traversing lug 203 of the master cylinder.

The sleeve has an exterior thread to accommodate nut 234, securing lug 203 to the sleeve.

The brake booster is attached by screw 220, whose head, of reduced diameter, 222, presses against extremity 232 of the sleeve. Threaded portion 236 crosses the bulkhead of the engine compartment for attachment by a nut, not shown.

This assembly uses frontal washer 230 to support the stress of the torque associated with attaching the master cylinder with a shoulder or fold realized on tube 222 to constitute the washer support. Under these conditions, bushing 232 must be used on the portion of tube 222 outside the housing to increase the diameter of the threads for attachment of lug 203 of the master cylinder with nut 234. This increase in diameter is necessary so the master cylinder can be removed without removing the pneumatic vacuum brake booster by accessing screw head 221 without removing it.

SUMMARY OF THE INVENTION

An object of the present invention is the improvement of the connection between the tubes for passage of the attachment screws and the housing of the vacuum brake booster to increase its reliability and the efficiency of the passage of the tubes through the back and cover of the housing and, in general, to simplify the realization of the tube and attachment of the master cylinder.

Another object of the present invention is to provide a method for realizing such a pneumatic vacuum brake booster.

To that end, an object of the present invention is a vacuum brake booster of the type described above, characterized in that the front extremity of the tube is threaded and has a peripheral groove in which a flange is crimped behind the cover in the housing.

The present invention thus allows for attachment of the master cylinder to the front of the housing through the use of threads at the front extremity of each tube, whose diameter will not have been reduced because the cover as well as the support for the lug of the master cylinder rest directly against the front face of the cover and by the cover against the crimped flange. The flange constitutes a stop washer secured to the tube by deformation without requiring the tube diameter to be reduced. Significantly, this enables elimination of the outside front bushing required by the prior art in order to accommodate the lug of the master cylinder and to be able to screw the nut to the threaded end of the bushing or sleeve, increasing the diameter. In general, the present invention simplifies the configuration by reducing the number of components and facilitates assembly while consequently reducing the cost.

According to another advantageous characteristic, the flange is formed of a ring that serves as a support surface for the cover around its tube bypass opening and a sleeve having a lip engaged in the groove by crimping.

According to another advantageous characteristic, the lugs of the master cylinder have openings traversed by the front extremity of the tube and secured by a nut screwed directly to the threads of the front extremity so that the lug is pressed against the front face of the cover, also pressed against the flange.

The present invention also concerns a method for realizing a vacuum brake booster whose housing is traversed by tubes for the passage of screws for securing the brake booster to the vehicle's passenger compartment, each tube being secured by crimping its rear extremity in an opening in the back of the housing, and near the front extremity, at a through-hole in the cover, the tube has a peripheral support and traverses the cover to accommodate, on the exterior, a lug of the master cylinder, secured by a nut screwed to the threaded front extremity of the tube.

The present invention concerns a method of the type described above characterized in that a groove is made in the front part of the tube and its rear extremity is fashioned so that this rear extremity can be crimped to the back of the housing. After crimping the rear extremity of the tube in the back, the piston is installed in the tubes and the subassembly thus realized is installed on the base plate of the indentor in such a way that the pins enter the rear extremity to serve as supports, and a flange is installed on the forward extremity of each tube, then the crimping indentor is installed by fitting the front extremities of the tubes into the cylindrical housing of the indentor; the crimp anvil is installed around the front extremity of the two tubes, behind the peripheral groove, so as to present the flared entrance in line with each groove and the passage to the outside diameter of the tube, immediately behind the peripheral groove; the crimp indentor is then pushed, which pushes the flange to engage the sleeve and its lip in the groove, thereby crimping the flange to the tube; the cover is put in position and assembled with the back by attaching the piston membrane in the crimping region between the back and the cover.

According to another advantageous characteristic, the crimp anvil consists of two parts connected along a joint plane passing through the axis of the passages in order to cap the two tubes when they are crimped and to be capable of disengaging after crimping.

The present invention will be described in greater detail by an embodiment of a vacuum brake booster, shown schematically in the attached drawings.

BRIEF DESCRIPTION OF THE DRAWINGS

FIG. 2 is an axial cutaway of the first step of crimping the tubes to the cover.

FIG. 2A illustrates a front view of a crimp anvil.

DETAILED DESCRIPTION

Figure 1:
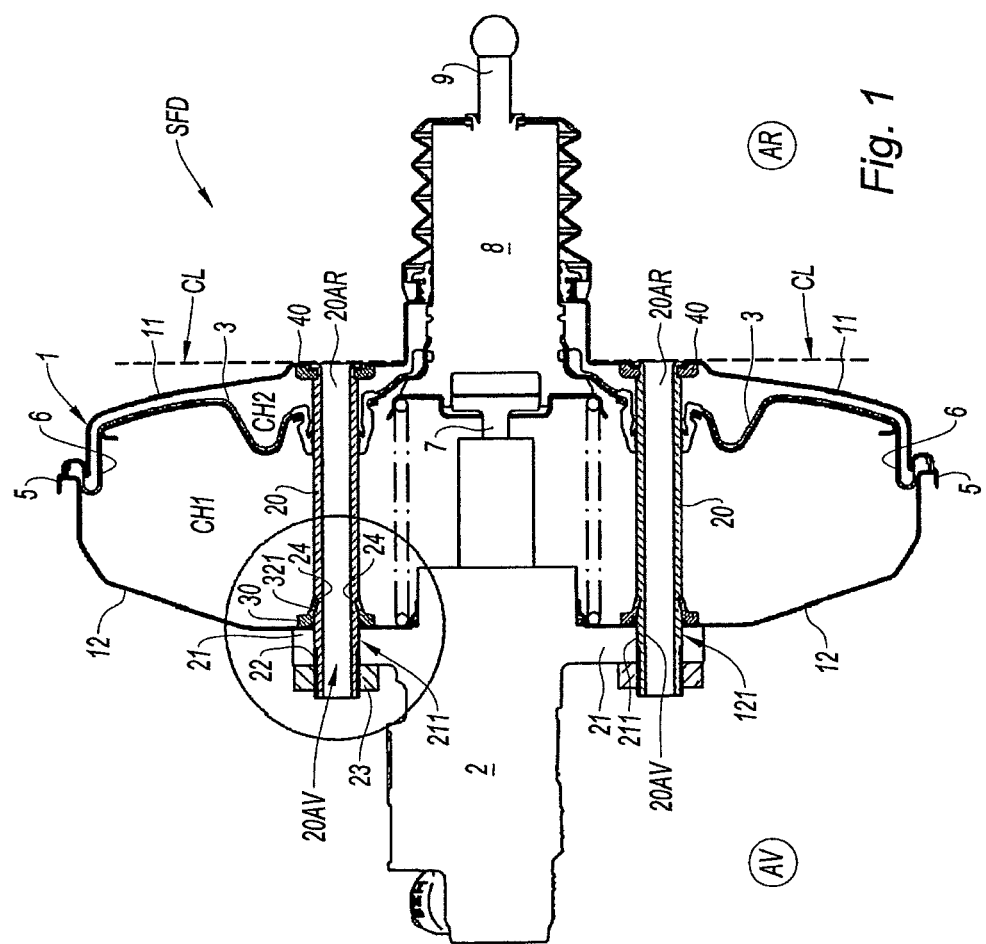
FIG. 1 is an axial cutaway of an embodiment of a vacuum brake booster according to the present invention.

According to FIG. 1, the object of the present invention is a vacuum brake booster (SFD) composed of vacuum housing 1 formed of back 11 connected to cover 12, with the interposition of rigid piston 3 connected to peripheral crimping region 5 of back 11 and cover 12 by membrane 6 so as to delimit, on either side of piston 3, a chamber CH1, CH2, each of which is initially under vacuum; one (CH2) of the chambers is brought to atmospheric pressure at the moment of braking in order to create the force acting on push rod 7 actuating master cylinder 2, such as a tandem master cylinder. Pneumatic control of the brake booster is provided by valve assembly 8, not shown in detail, actuated by control rod 9, which is itself connected to the brake pedal, which is not shown. Master cylinder 2 is attached to the brake booster (SFD) and the assembly, thus assembled, is attached to the partition (CL) separating the motor compartment (AV) and the passenger compartment of the vehicle at the rear (AR), depending on the orientation of the vehicle. This attachment occurs, as known, by screws crossing housing 1 of the brake booster in tubes 20 secured to housing 1 of the brake booster and providing the seal for the chambers. These tubes 20 also cross piston 3 in leakproof manner.

Housing 1 is, in general, crossed by two tubes 20 and thus accommodates two screws equipped with a nut for attachment to the partition (CL). Each tube is attached to back 11 of housing 1 and supports cover 12, the screw also serving to attach master cylinder 2 by its two lugs 21, each of which is traversed by tube 20.

According to the present invention, front extremity 20AV of tube 20 is provided, on the interior of the housing, turned toward cover 12, with flange 30, which is secured by crimping to the thickness of tube 20 and serves as a support to accommodate cover 12; then lug 21 of master cylinder 2 is secured to the outside of the cover by nut 23 screwed to the threaded front extremity 22 of tube 20.

Rear extremity 22AR of tube 20, on the partition CL side, is crimped to back 11 of housing 1 of the brake booster through the interposition of a support ring. 40

Figure 1A:
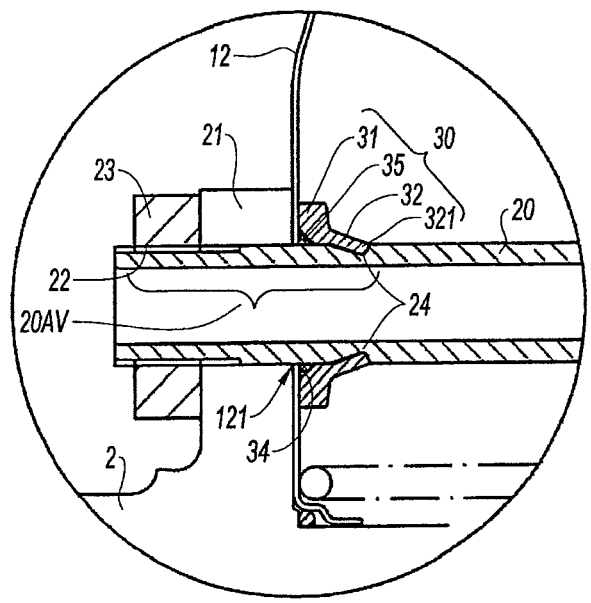
FIG. 1A is an enlarged view of detail A of FIG. 1.
Figure 2B:
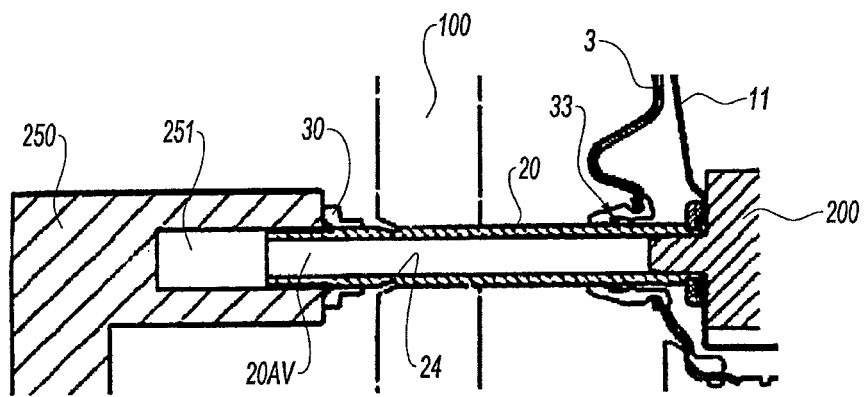
FIG. 2B is an enlarged detail view of part IIA of FIG. 2.

Based on the enlarged drawing in FIG. 1A, crimped flange 30 is formed by crown 31 and retainer sleeve 32, terminated by lip 321. Sleeve 32 is crimped and hooked into peripheral groove 24 realized in tube 20 beyond threaded portion 22 on the interior of cover 12.

Front extremity 20AV of tube 20 has a smooth exterior surface for passage through opening 121 in cover 12 and the breadth of lug 21, and threads 22 to accommodate nut 23 securing lug 21 of master cylinder 2 to cover 12.

The other elements of the brake booster (SFD), which are generally known, are not detailed.

FIGS. 2, 2A, 2B, and 3 illustrate the installation of flanges 30 on each of tubes 20, which are, in principle, identical.

Based on FIG. 2, after assembly of back 11 of housing 1 and rear extremity 20 AR (passenger compartment side) of each of tubes 20 and installation of piston 3 in two tubes 20, crimp anvil 100 (FIG. 2A), consisting of two portions 110 assembled along diametral (vertical line) joint plane 111, is installed; the anvil has, along joint plane 111, two crimp openings 112 having flared entrance 112a and passage 112b, whose diameter corresponds to the exterior diameter of tube 20.

This crimp anvil 100 is installed on both of tubes 20, which are themselves held by base plate 200, equipped with two pins 210a, b, engaged in tubes 20. This base plate 200 can be a portion of the crimping tool that was previously used to crimp rear extremity 20 AR of tube 20 to back 11. Each of tubes 20 is equipped with peripheral groove 24.

Each of flanges 30 is engaged in front extremity 20 AV of tube 20, which remains beyond groove 24 and already secured to back 11 and crosses piston 3 and its seal 33, the cover having not yet been assembled. Flanges 30 are then pushed with crimp indentor 250, which has two cylindrical housings 251 pressed onto extremity 20 AV of each of tubes 20 so as to push both flanges 30 into crimp anvil 100. Indentor 250 is applied to ring 31 and sleeve 32 is guided by crimp anvil 100 for engagement in peripheral groove 24, previously realized in each tube 20.

Figure 3:
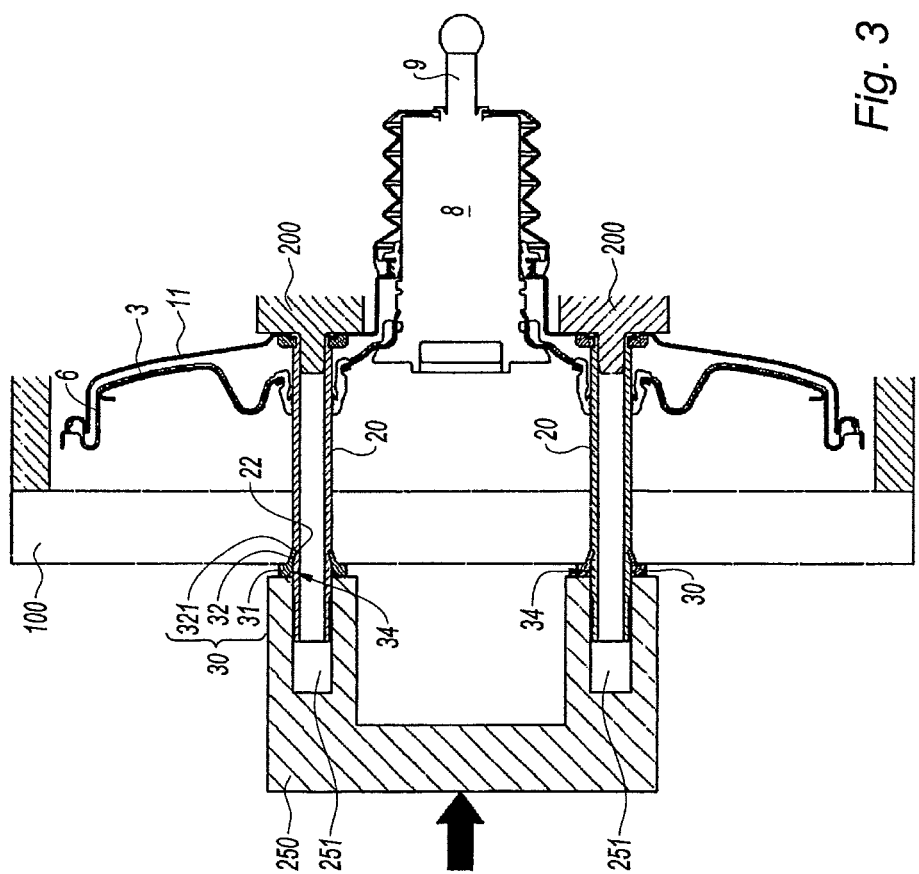
FIG. 3 shows the second step of crimping the notched flanges to the bypass tubes.
Figure 4:
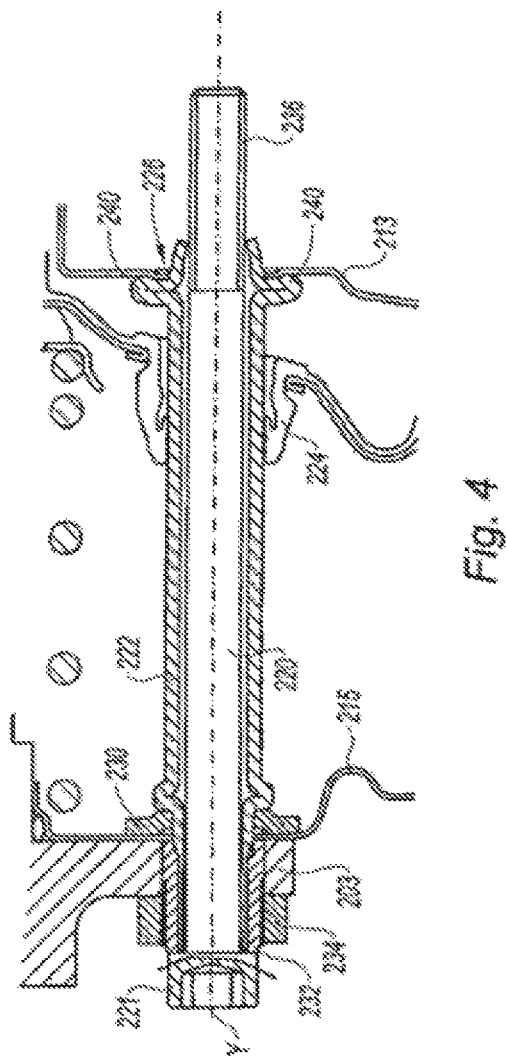
FIG. 4 corresponds to FIG. 2C of EP 2,058,195.

FIG. 3 illustrates the conclusion of the crimping operation, lip 321 of sleeve 32 of each flange 30 being engaged and pressed into peripheral groove 24 of each tube 20. Note that each flange 30 leaves free space 34 in the shape of a wedge around tube 20 to accommodate gasket 35, which presses against flange 30, against tube 20 and against cover 12 around opening 121 of the cover. (FIG. 1A).

Assembly of the brake booster then continues with the installation of cover 12 and master cylinder 2, thereby constituting the assembly that can be installed in the vehicle.

REFERENCE KEY

SFD vacuum brake booster
CH1,CH2 housing chambers
CL partition
AV front/engine compartment
AR rear/vehicle passenger compartment
1 vacuum housing
2 master cylinder
21 lug
22 threaded front portion
23 nut
24 peripheral groove
3 rigid piston
5 peripheral crimp region
6 membrane
7 push rod
8 valve assembly
9 control rod
11 back of housing
12 housing cover
121 opening in cover
20 tube
20 AV front extremity of tube 20
20 AR rear extremity of tube 20
100 crimp anvil
110 portion of anvil 111 joint plane
112 crimp opening
112a flared entrance
112b passageway
200 base plate of crimp indentor
210a,b pin
250 crimp indentor
251 cylindrical housing
30 flange
31 ring
32 sleeve
321 lip
33 seal
34 free space
35 seal

The invention claimed is:

1. A vacuum brake booster for a vehicle, comprising:
a housing, which is formed by a back and a cover with an intermediary piston, therein delimiting two chambers, and which is crossed by tubes for the passage of screws for attachment of the brake booster to a partition of a vehicle passenger compartment;
wherein each tube is attached by crimping its rear end in an opening in a back of the housing and near a front extremity, to a through-hole of the cover,
wherein each tube crosses the cover to accommodate, on the exterior, a lug of a master cylinder, secured by a screwed nut, and
wherein the front extremity of each tube is threaded and has a peripheral groove in which a flange is crimped behind the cover in the housing, the crimping of the flange leaving a wedge-shaped free space, the wedge-shaped free space accommodating a gasket between the flange and a respective tube.

2. The vacuum brake booster of claim 1, wherein the flange is formed by a ring constituting a support surface for the cover around its opening for passage of a respective tube and a sleeve with a lip engaged in the groove by crimping.

3. The vacuum brake booster of claim 1, wherein the lugs of the master cylinder have openings crossed by the front extremity of each tube and secured by a nut directly screwed onto the threads of the front extremity so that the lug can press against the front face of the cover while also pressing against the flange.

4. A method for making a vacuum brake booster whose housing is crossed by tubes for the passage of screws for attachment of the brake booster to a partition of a vehicle passenger compartment, the method comprising:
making a peripheral groove in a front portion of each tube, wherein a rear extremity of each tube is configured so that the rear extremity is crimpable to the back of the housing, wherein the housing is formed by the back and a cover;
attaching each tube to the back of the housing by crimping its rear extremity in an opening in the back of the housing, wherein near a threaded front extremity, at a through-hole in the cover, each tube crosses the cover to accommodate, on the exterior, a lug of a master cylinder;
installing, after having crimped the rear extremity of each tube in the back, an intermediary piston on the tubes, therein delimiting two chambers in the housing;
installing a flange including a ring, a sleeve, and a lip on the front extremity of each tube;
pushing each flange so as to engage the sleeve and the lip in the peripheral groove and crimp each flange to its respective tube, wherein the crimping of each flange leaves a wedge-shaped free space configured to accommodate a gasket between each flange and its respective tube;
inserting a gasket between each flange, its respective tube, and the cover;
installing the cover and attaching it to the back by securing a membrane of the piston in a crimp region between the back and the cover; and
securing the cover between the lug of the master cylinder and the ring of the flange by a nut screwed to the threaded front extremity of each tube.

5. The method of claim 4, further comprising capping each tube when it is crimped.

* * * * *